(12) United States Patent
Aloumanis et al.

(10) Patent No.: US 10,219,571 B1
(45) Date of Patent: *Mar. 5, 2019

(54) IN HELMET SENSORS PROVIDING BLIND SPOT AWARENESS

(71) Applicants: Peter Aloumanis, Boca Raton, FL (US); Elias W. Aloumanis, Boca Raton, FL (US)

(72) Inventors: Peter Aloumanis, Boca Raton, FL (US); Elias W. Aloumanis, Boca Raton, FL (US)

( * ) Notice: Subject to any disclaimer, the term of this patent is extended or adjusted under 35 U.S.C. 154(b) by 1227 days.

This patent is subject to a terminal disclaimer.

(21) Appl. No.: 13/671,651

(22) Filed: Nov. 8, 2012

(51) Int. Cl.
*A42B 3/04* (2006.01)
*G08B 7/06* (2006.01)

(52) U.S. Cl.
CPC .............. *A42B 3/0453* (2013.01); *G08B 7/06* (2013.01)

(58) Field of Classification Search
None
See application file for complete search history.

(56) References Cited

U.S. PATENT DOCUMENTS

| | | | | |
|---|---|---|---|---|
| 2009/0063053 A1* | 3/2009 | Basson | .................. | G08G 1/167 |
| | | | | 702/1 |
| 2010/0080418 A1* | 4/2010 | Ito | ...................... | G06K 9/00228 |
| | | | | 382/103 |
| 2012/0293506 A1* | 11/2012 | Vertucci | ................... | G06N 3/04 |
| | | | | 345/419 |

FOREIGN PATENT DOCUMENTS

WO    WO2011058584 A1 *  5/2011   ............... G06F 3/01

* cited by examiner

*Primary Examiner* — Dakshesh D Parikh
(74) *Attorney, Agent, or Firm* — Patents on Demand, Pa; Brian K. Buchheit

(57) ABSTRACT

A motorcycle helmet includes electronic components operating within the motorcycle helmet. At least a portion of the electronic components is embedded within an outer shell of the helmet or an inner shell of the helmet. The plurality of electronic components comprise one or more internally mounted sensors for detecting objects present in a blind spot of a wearer. A software program may execute within the electronic components, which receiving processed output based on data from the one or more internally mounted sensors. An output mechanism integrated into the motorcycle helmet and electronically coupled to the electronic components may present the processed output to a wearer of the helmet.

19 Claims, 7 Drawing Sheets

IN HELMET SENSORS PROVIDING BLIND SPOT AWARENESS

BACKGROUND

The present invention relates to the field of human worn helmets and, more particularly, to helmets that leverage in-helmet sensors for providing blind spot awareness.

Helmets are worn to protect a wearer's head in many contexts. Common helmets include motorcycle helmets, bicycle helmets, sporting game helmets, combat helmets, and the like. As helmets provide protection from impact and accidents, they are ideally situated for protecting important sensors and electronics, which can be used to increase a user's experience and/or to monitor and record accidents and other events.

Traditional helmets, however, often impede a wearer's field of vision and/or prevent a user from clearly hearing environmental noises. Many motorcycle accidents result from a rider not being aware of vehicles hiding in the rider's blind spot.

BRIEF SUMMARY

In one embodiment of the disclosed invention, a motorcycle helmet includes electronic components operating within the motorcycle helmet. At least a portion of the electronic components is embedded within an outer shell of the helmet or an inner shell of the helmet. The plurality of electronic components comprise one or more internally mounted sensors for detecting objects present in a blind spot of a wearer. A software program may execute within the electronic components, which receiving processed output based on data from the one or more internally mounted sensors. An output mechanism integrated into the motorcycle helmet and electronically coupled to the electronic components may present the processed output to a wearer of the helmet.

One aspect of the present invention can include a method, a system, a computer program product, and an apparatus for notifying a motorcycle helmet wearer about objects in their blind spot. One or more blind spot sensors are integrated into a motorcycle helmet, which receive environmental input. Electronics of the motorcycle helmet process the environmental input to determine a presence of an object or vehicle in a blind spot of a wearer of the motorcycle helmet. At least one output element integrated into the motorcycle helmet presents a notification of the object to the wearer in real time responsive to the processing and determining of the presence of the object in the blind spot.

One aspect of the present invention can include a method, a system, a computer program product, and an apparatus for receiving an image or a video captured from a rearward or sideward facing sensor of a motorcycle helmet. The sensor can be embedded in an electronics layer sandwiched between an outer shell of the helmet and an inner shell of a motorcycle helmet. The image or video is processed utilizing electronic circuitry in the electronics layer of the helmet. Results of the processing are presented through an output presentation element of the helmet. For example, results can include a generated audible notification indicating an approach of a vehicle from behind or from the side. In one embodiment, the video or image can be displayed within a heads up display of the helmet.

DETAILED DESCRIPTION

Figure 1A:
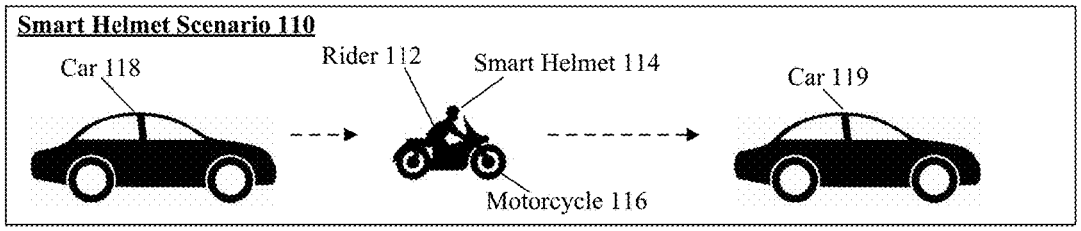
FIG. 1A is a schematic diagram illustrating a scenario and a set of embodiment for embedding intelligent electronics within a motorcycle helmet in accordance with an embodiment of the inventive arrangements disclosed herein.
Figure 1A:
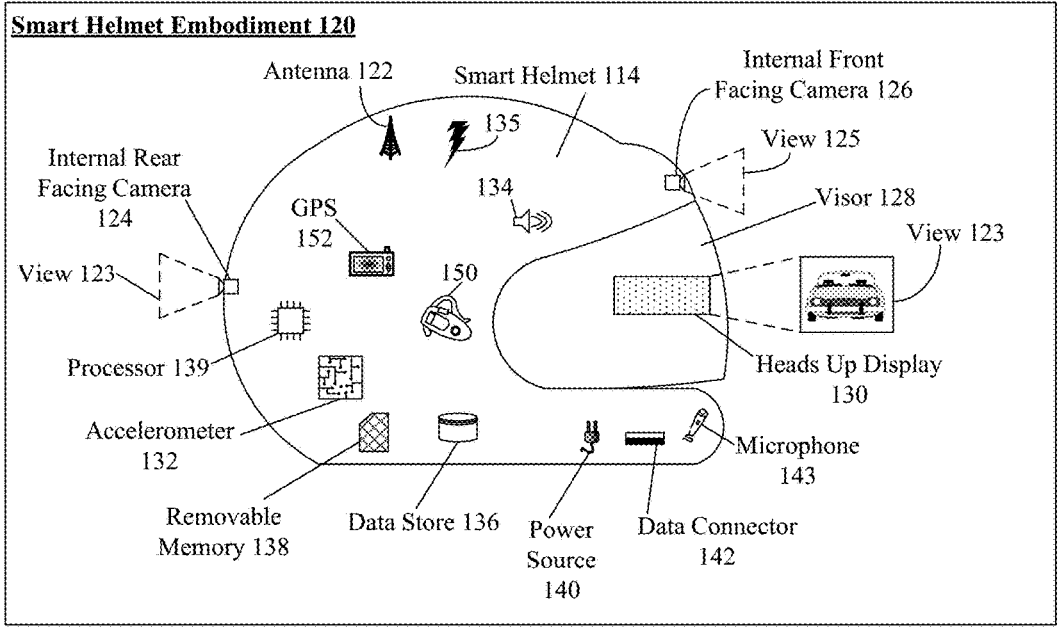
Figure 1A:
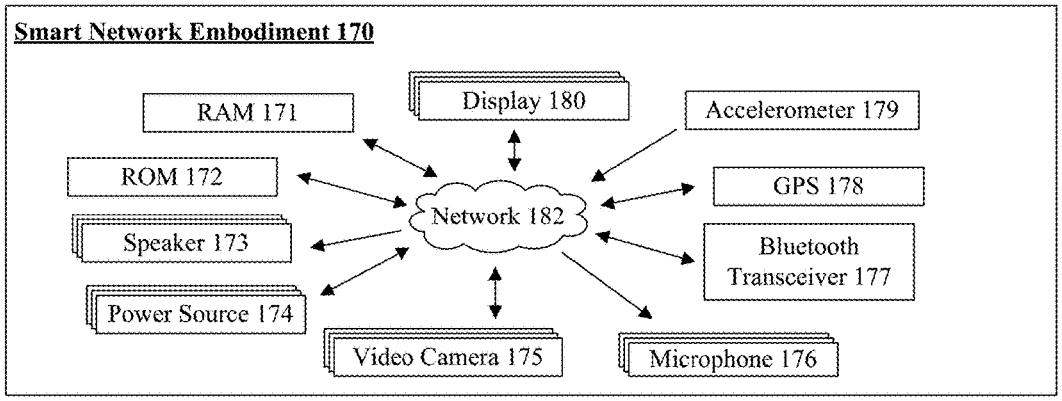

The present disclosure is a solution for embedding one or more sensors within a motorcycle helmet, and using this set of one or more sensors to detect objects within a wearer's blind spot and to provide warnings of the same.

More specifically, the disclosure places one or more rearward facing and/or sideward facing sensors within the helmet. These sensors can include one or more a video camera, a motion detector, a sonic sensor, a proximity detector, an audio transducer, and the like. Each sensor is designed to gather environmental information for a user, which a user lacks line-of-sight access to (and/or which the user cannot easily hear). Sensor gathered data can be presented to the user via one or more output element. For example, a user can be presented an audible tone or other warning via one or more in-helmet speakers. In another embodiment, a computer generated speech output can be used to convey the notification. Additionally, the user can be presented a visual indication, such as through a light, a text message, an image, and the like. In one embodiment, the helmet can include a heads up display which present the warning to the user. In one embodiment, video output can be presented to the user, which shows video from rearward and/or sideward facing cameras. Output elements in the helmet as well as output elements on a motorcycle (functioning in response to signals from the helmet) can be used to convey the notification/indication/warning that apprises a wearer of an object in his/her blind spot.

In embodiments of the disclosure, warnings (as opposed to video) can be audibly or visually displayed to the wearer in a minimally intrusive manner. Thus, users that could be distracted by a constant video feed (effectively a rear-view mirror) can receive less obtrusive indications of proximate objects. In one embodiment, a user can selectively enable/disable a side or rear camera view. In still another embodiment, a side and/or rear view can be dynamically presented/hidden so that it is only active when an object of interest is detected by that camera or sensor. In one embodiment, the rear and/or side sensors can be linked to motorcycle or vehicle displays, so that detected video/objects are shown on a vehicle display as opposed to being shown on a helmet included display. A wireless communication link (e.g., BLUETOOTH, wireless USB, WIFI, etc.) can be used to communicate sensor information and display information between the helmet and the vehicle, in one embodiment.

In one contemplated embodiment, sensor information from the rearward and/or sideward sensors (including video camera) can be persisted in a storage device. This storing of video/images/information can occur responsive to an explicit user selection for recording in one embodiment. In another embodiment, the recording can occur automatically responsive to a detection of a significant event (such as an accident, an emergency stop, etc.). This information can be stored along with other sensor gathered information, such as time, location, etc. Stored information, such as the above, can be useful in determining causes of fault for insurance and/or responder citation purposes. Stored information can also assist emergency responders (such as healthcare professionals) to provide proper health assistance (given an indicant involving a helmet wearer) quickly.

It should be emphasized that although embodiments of the disclosure focus on motorcycle helmets, many innovations detailed herein are equally applicable to other type of helmets, use of which are contemplated herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating a scenario 110 and a set of embodiment 120, 170 in accordance with an embodiment of the inventive arrangements disclosed herein. Scenario 110 and/or embodiment 120, 170 can be performed in the context of method 200, and/or system 300. In scenario 110, a motorcycle rider 112 can operate the motorcycle 116 on a roadway which can be occupied by car 118 and/or car 119. For example, rider 112 can ride motorcycle 116 in front of car 118 and behind car 119. Embodiment 120, 170 can represent exemplary configurations of smart helmet 114 worn by rider 112. Embodiment 120 can illustrate a smart helmet component arrangement for helmet 114. Embodiment 170 can illustrate a smart network associated with smart helmet 114. As expressed, the smart helmet 114 can include multiple different sensors, which work together to detect objects within a blind spot.

In embodiment 120, smart helmet 114 can include, but is not limited to, an internal front facing camera 126, an internal rear facing camera 124, an accelerometer 132, a volatile memory (e.g., data store 136), a non-volatile memory (e.g., removable memory 138), a power source 140, a data connector 142, a heads up display (HUD) 130, a Global Positioning System 152, an antenna 122, a processor 139, a network transceiver 135, a Bluetooth transceiver 150, loudspeaker 134, a microphone 143, and the like. It should be appreciated that embodiment 120 can include, one or more sensors not shown within embodiment 120. For example, embodiment 120 can include a thermometer (e.g., thermostat), vibrational sensor, and the like. In one embodiment, sensors used for blind stop detection and notification can be used leveraged for providing additional functions to a wearer, as expressed herein.

In one configuration of the embodiment 120, helmet 114 can include a front facing camera 126 and/or a rear facing camera 124. In one embodiment, the camera(s) 124/126 can include two angled covering a wearer's blind spots on each side. In one embodiment, the angles can be positioned so that even when a passenger riding behind the wearer is present, the blind spot(s) are covered. In still another embodiment, cameras or other sensors can be present in a passenger's helmet, which communicate information to the driver's helmet to be utilized in conjunction with information gathered from driver helmet 114 sensors.

In one embodiment, camera 124, 126 can be utilized to present relevant media streams within the heads up display 130 of the visor 128. For example, rear facing camera 124 can be utilized to present view 123 of car 118, enabling rider 112 to be aware of potential danger posed by car 118. In one embodiment, one or more cameras and/or sensors can be embedded within the helmet to reduce the blind spot of rider 112. For example, as car 118 passes rider 112, a camera facing the blind spot can present a video feed of the car 118 within HUD 130 as it passes by. Audible warnings, tones, and the like can also be used to convey a warning to the rider. Embodiments are contemplated where instead of a video feed being shown in the HUD 130, a text warning, light, icon, or other visual indicator can be activated to warn the rider of the presence of an impediment within the rider's blind spot.

In one instance, data store 136 and/or memory 138 can be utilized to persist sensor information (e.g., video from camera 124, 126). In the instance, helmet 114 can function as a black box device permitting important pre-collision, collision, and/or post collision information to be obtained. For example, a rider 112 can utilize information within removable memory 138 to determine the cause of a collision (e.g., slippery road, too much lean, etc).

In one instance, helmet 112 can be employed within a racing environment such as a race track to assist a rider 112 in real-time or near real time. For example, as a rider 112 laps a race track, previous sensor information (e.g., speed) can be provided prior to critical features of the race track (e.g., before a hairpin turn).

Antenna 122 can be an electrical device which can converts electric power into radio waves and radio waves into electric power. Antenna 122 can be a radio transmitter which can be utilized for wireless communication. For example 122 can be an 802.11b/g/n (WiFi) antenna.

Camera 124, 126 can be device that records images (e.g., JPEG, GIF) that can be stored directly, transmitted to another location, or both. Camera 124, 126 can include, but is not limited to, an image camera, a video camera, a night vision camera, and the like. Camera 124, 126 can capture images from view 123, 125 which can be persisted within data store 136, memory 138, and/or a remote data store (e.g., USB hard drive). View 123, 125 can be presented in real-time or near real-time within heads up display 130. It should be appreciated that helmet 114 is not limited to two cameras and can include an arbitrary number of cameras. Camera 124, 126 can be similar and/or dissimilar in functionality, capabilities, and the like. In one instance, camera 124, 126 resolution can range from eight megapixels to thirteen megapixels. In one embodiment, camera 124, 126 can be a high definition (HD) camera.

Heads up display 130 can be a transparent display which can presents data without requiring rider 112 to look away from a selected viewpoint. Display 130 can be presented within visor 128 (e.g., embedded display), presented within a display proximate to helmet 114, and the like. Display 130 technology can include liquid crystal display (LCD), liquid crystal on silicon (LCoS), digital micro-mirrors (DMD), organic light-emitting diode (OLED), optical waveguide, scanning laser, and the like. Display 130 can present relevant information in real-time or near real-time.

Accelerometer 132 can be a device that can measure proper acceleration. Accelerometer 132 can include a one axis accelerometer, a two-axis accelerometer, a three-axis accelerometer, and the like. For example, accelerometer 132 can be a tilt sensor. In one instance, accelerometer 132 can be utilized to receive motion input from rider 112. It should be appreciated that the accelerometer 132 can be utilized to detect falls, impacts, and the like.

Loudspeaker 134 can be an electroacoustic transducer that can produce sound in response to an electrical audio signal input. Loudspeaker 134 can include a full range driver, a subwoofer, a woofer, a mid-range driver, a tweeter, a coaxial driver, piezoelectric speaker, and the like. Loudspeaker 134 arrangements can include, but is not limited to, monophonic, stereophonic, quadraphonic, surround, and the like.

Data store 136 and removable memory 138 can be a recording media for retaining digital data. Store 136, memory 138 can include, but is not limited to, non-volatile memory, volatile memory, and the like. Store 136, memory 138 can include, but is not limited to, Dynamic Random Access Memory (DRAM), Static RAM (SRAM), Ferroelectric RAM (F-RAM), Flash memory, Programmable Read Only Memory (PROM), Electronic PROM (EPROM), Erasable EPROM (EEPROM), and the like.

Processor 139 can be a central processing unit able to carry out instructions of a computer program by performing the basic arithmetical, logical, and input/output operations. Processor 139 can include, but is not limited to, an arithmetic logic unit (ALU), a graphical processing unit (GPU), and the like. In one instance, processor 139 can include multi-core processors. The processor 139 can be utilized for traditional and/or proprietary capabilities including, but not limited to, audio/video processing, sensor management, and the like.

Power source 140 can include an external power source, an internal power source, a removable power source, and the like. Power source 140 can include, but is not limited to a battery, an alternating current (AC) power supply, a direct current (DC) power supply, and the like. Power source 140 can be utilized to power components 122-152, proximate devices, and the like. Power source 140 can conform to a Universal Serial Bus, a proprietary interface, and the like.

Microphone 143 can be an acoustic-to-electric transducer or sensor that can convert sound into an electrical signal. Microphone 143 can include, but is not limited to, a dynamic microphone, piezoelectric microphone, fiber optic microphone, and the like. Microphone 143 can include a single, multiple microphones, and the like. Microphone 143 can be omni-directional, unidirectional, cardioid, and the like.

Data connector 152 can be an electronic component for physically mating an electronic input with an electronic output. In one instance, data connector 142 can include one or more traditional and/or proprietary data connectors. Connector 142 can include, but is not limited to Universal Serial Bus (USB), FIREWIRE, External Serial AT Attachment (eSATA), and the like. In one embodiment, connector 142 can permit data stored within memory 138 and/or data store 136 to be downloaded.

Bluetooth transceiver 150 can be a transceiver able to permit near field communication. Transceiver 150 can permit short-wavelength radio transmissions in the ISM band 2400-2480 MHz. Transceiver 150 can be communicatively linked to a Bluetooth device (e.g., mobile phone), permitting traditional and/or proprietary actions to be enabled. In one instance, Bluetooth transceiver 150 can be utilized to communicate with proximate devices (e.g., mobile phone) to perform voice operations including, but not limited to, call emergency services, text messaging a pre-defined contact, and the like. In one embodiment, transceiver 150 can permit communication with an on-board diagnostic system permitting helmet 114 information to be communicated to a proximate device, a HUD 130, and the like.

Global Positioning System 152 can be any navigation system that can provide location and time. System 152 can include traditional and/or proprietary functionality. In one instance, GPS 152 can present GPS data within HUD 130. GPS 152 can utilize microphone 143, loudspeaker 134, and the like to permit turn by turn directions, navigation customization, and the like.

Smart network embodiment 170 illustrates a communications network 182 within smart helmet 114. Network 182 can permit communication between components 171-180. Network 182 can conform to one or more traditional and/or proprietary network topologies, protocols, and the like. For example, network 182 can be a personal area network (PAN) enabling communication with vehicle on-board devices, proximate devices, and the like. In one instance, network 182 can be utilized to link multiple riders together via a mesh network (e.g., mobile ad hoc network). It should be appreciated that network 182 can permit one or more traditional and/or proprietary communication mechanisms, including, but not limited to, electronic mail, text exchange, Voice over Internet Protocol, and the like.

It should be appreciated that helmet 114 can include basic computing components including, but not limited to, one or more processors, one or more buses, a user interface, and the like. It should be understood that helmet 114 can be constructed from commercial off-the-shelf (COTS) electronics permitting helmet 114 cost to be competitive. It should be appreciated that components 122, 152 can include optional components such as a vibration motor, a Light Emitting Diode (LED) indicator, and the like. It should be understood that helmet 114 can include full face helmets, motorcross helmets, modular helmets, open face helmet, and the like.

Figure 1B:
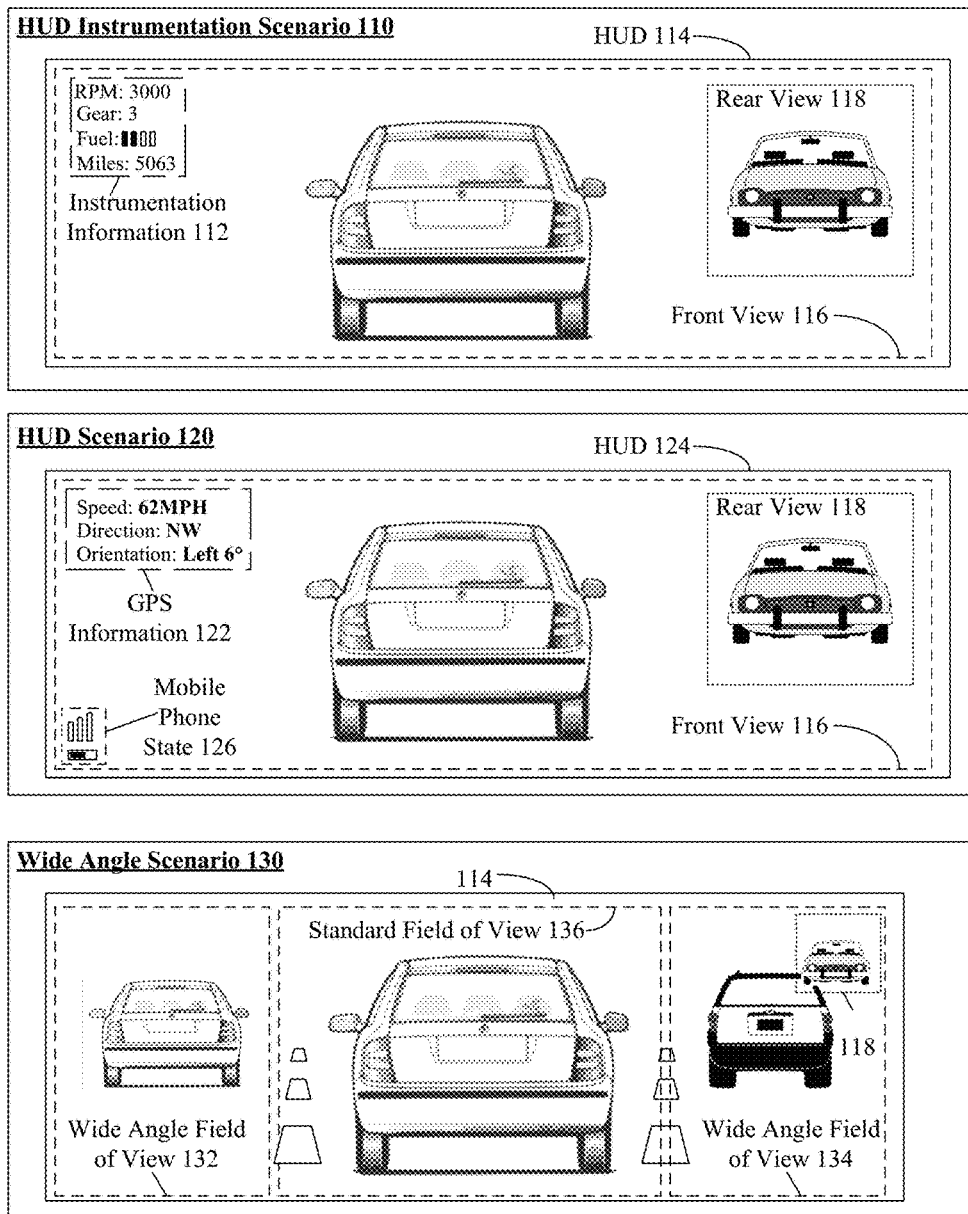
FIG. 1B is a schematic diagram illustrating a set of scenarios for utilizing embedded intelligent electronics within a motorcycle helmet in accordance with an embodiment of the inventive arrangements disclosed herein.

FIG. 1B is a schematic diagram illustrating a set of scenarios 110-130 for utilizing embedded intelligent electronics within a motorcycle helmet in accordance with an embodiment of the inventive arrangements disclosed herein. Scenario 110-130 can be performed in the context of method 200 and/or system 300. Scenario 110-130 can be contextually similar to FIG. 1A scenario 110. That is, in scenario 110-130, a rider can be travelling on a roadway between two cars.

In scenario 110-130, HUD 114, 124, 134 can include a front view 116 and a rear view 118. Front view 116 can include a view through a visor (e.g., real world environment, real world objects) and/or a graphical user interface (e.g., information 112, information 122). In one instance, view 116 can include a rear view 118 which can include audio/video from a rear mounted sensor (e.g., camera).

In scenario 110, a heads up display (HUD) 114 can present instrumentation information 112 of a motorcycle. HUD 114 can include instrumentation information 112, front view 116 (e.g., front facing camera), rear view 118, and the like. Information 112 can include, but is not limited to, engine information (e.g., revolutions per minute), a fuel gauge, odometer, speedometer, oil temperature, and the like.

In scenario 120, a HUD 124 can present device information from proximate (e.g., communicatively linked) devices. Information can include global positioning information 122, mobile phone state 126, and the like. GPS information 122 can include, but is not limited to, maps, navigation information, and the like. Phone state 126 can include, but is not limited to, battery information, signal information, caller ID, multimedia information (e.g., now playing), and the like.

In scenario 130, two or more cameras within a helmet can be utilized to provide a wide angle view within HUD 134. Two or more front facing cameras can be employed to capture images/video from a front point of view (e.g., direction of travel).

For example, two cameras can be leveraged to capture a 180 degree field of view. The images/video can be presented seamlessly within HUD 134. For example, wide angle field of view 132, 138 can provide visual assistance to a rider by enabling the rider to see cars to the left and/or right of their position. That is, the field of view 132, 138 can compensate for the limited field of view resulting from helmet design.

Figure 1C:
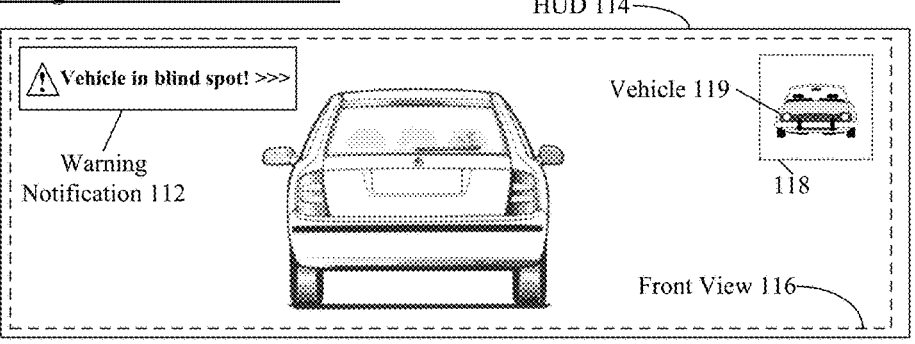
FIG. 1C is a schematic diagram illustrating a set of scenarios for utilizing embedded intelligent electronics within a motorcycle helmet in accordance with an embodiment of the inventive arrangements disclosed herein.
Figure 1C:
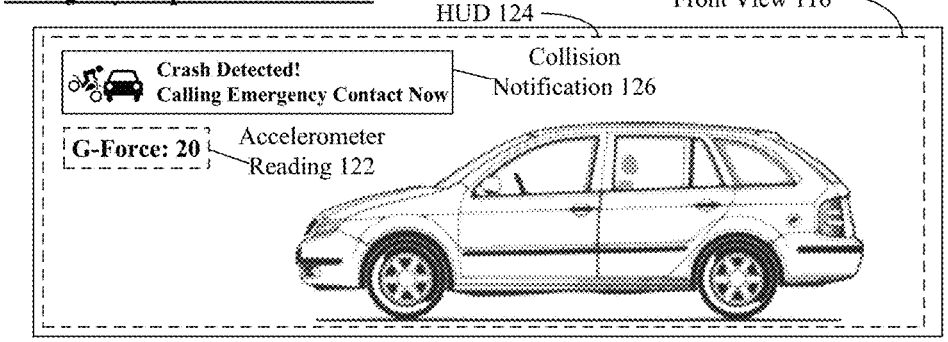
Figure 1C:
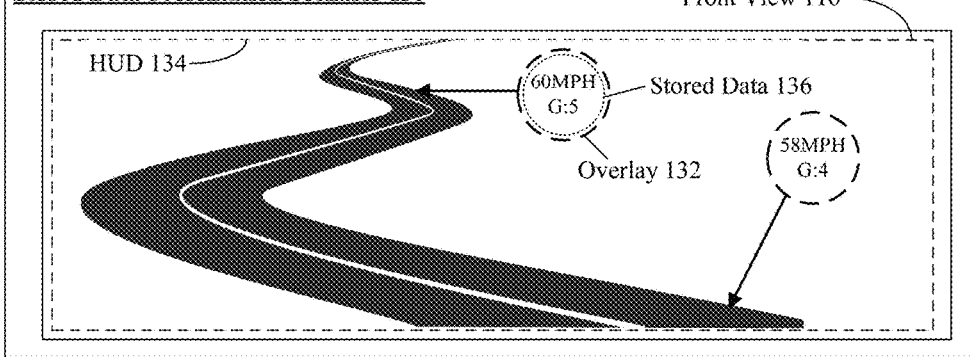

FIG. 1C is a schematic diagram illustrating a set of scenarios 110-130 for utilizing embedded intelligent electronics within a motorcycle helmet in accordance with an embodiment of the inventive arrangements disclosed herein. Scenario 110-130 can be performed in the context of method 200 and/or system 300. Scenario 110-130 can be contextually similar to FIG. 1A scenario 110. That is, in scenario 110-130, a rider can be travelling on a roadway between two cars.

In scenario 110-130, heads up display (HUD) 114, 124, 134 can include a front view 116 and/or a rear view 118. Front view 116 can include a view through a visor (e.g., real world environment, real world objects) and/or a graphical user interface (e.g., notification 112, reading 122). In one instance, view 116 can include a rear view 118 which can include audio/video from a rear mounted sensor (e.g., camera).

In scenario 110, HUD 114 can present a warning notification 112 within front view 116. Notification 112 can be associated with an object detection system, motion detection system, and the like. For example, notification 112 can be presented when an object is detected outside the viewpoint of a rider wearing the helmet. In one instance, when a vehicle 119 is within a blind spot of a rider wearing the helmet, notification 112 can be presented. It should be appreciated that notification 112 can include directional audio/video. For example, when a vehicle is approaching from the right, notification 112 can present an appropriate visual (e.g., ">>>" arrows) and audio cue (e.g., right stereo speaker alert). In one instance, rear view 118 can present audio/video of a vehicle associated with notification 112. Notification 112 can include vehicle information, customized information, and the like. Notification 112 can include traditional and/or proprietary alert mechanisms. For example, a chime can be used to indicate a vehicle is approaching rapidly from the rear. Notification 112 can include user customizable notifications.

In scenario 120, a collision notification 126 can be presented within a HUD 124 when a collision is detected by the helmet. The notification 126 can associated with an emergency action, collision information, and the like. For example, the emergency action can include automatically calling an emergency contact in response to the collision. It should be appreciated that pre-event/post-event sensor information (e.g., reading 122) can be optionally presented, persisted, and the like.

In scenario 130, a HUD 134 can be utilized to present stored data 136 within an overlay 132. In one instance, stored data 136 can include automatically collected sensor information, user provided data, and the like. In the embodiment, stored data 136 can be presented within a navigation map. For example, speed and gear information can be presented for a race track map within HUD 134. It should be appreciated that the data 136 can be presented in real-time or near real-time.

Drawings presented herein are for illustrative purposes only and should not be construed to limit the invention in any regard. Scenario 110-130 can be associated with an Advanced Automatic Collision Notification (AACN) system, a pre-collision system, a Vehicular Emergency Data Set, and the like.

Figure 1D:
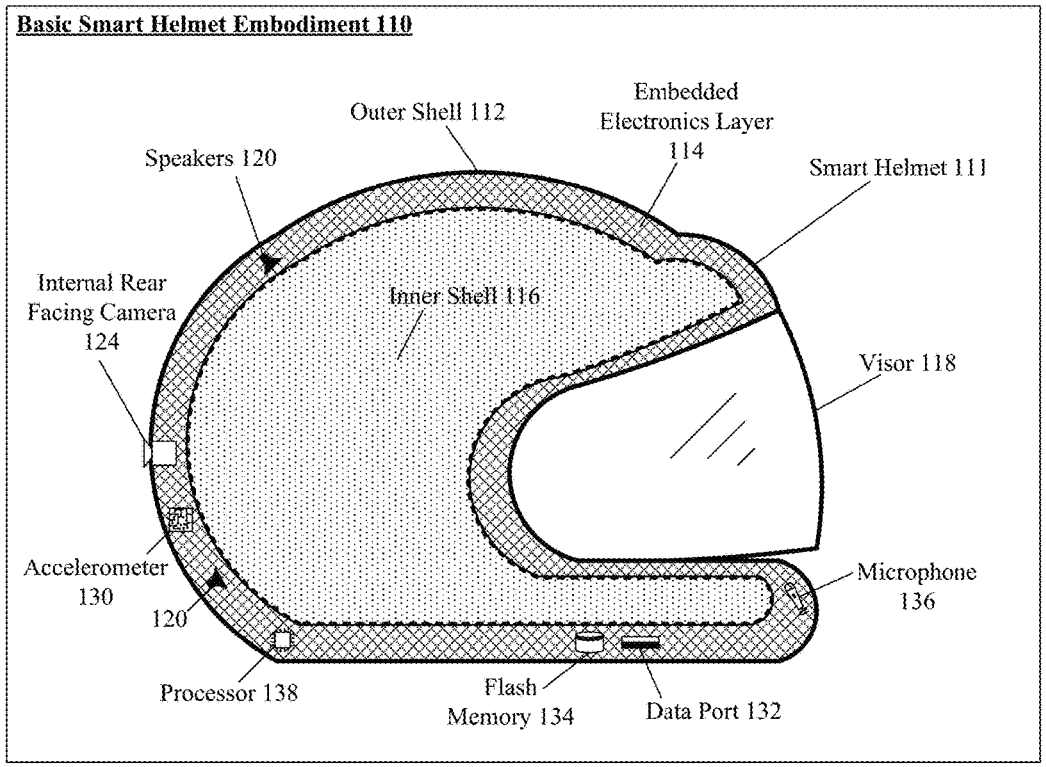
FIG. 1D is a schematic diagram illustrating an embodiment for embedding intelligent electronics within a motorcycle helmet in accordance with an embodiment of the inventive arrangements disclosed herein.

FIG. 1D is a schematic diagram illustrating an embodiment 110 for embedding intelligent electronics within a motorcycle helmet in accordance with an embodiment of the inventive arrangements disclosed herein. Embodiment 110 can be present in the context of method 200 and/or system 300. In embodiment 110, a simple smart helmet 111 can be created utilizing components 120-138. Components 120-138 can include optional components which can be omitted permitting the smart helmet functionality is retained. It should be appreciated that helmet 111 can be similar and/or dissimilar to embodiments disclosed herein.

In embodiment 110, an embedded electronics layer sandwiched between an outer shell 112 and an inner shell 116 of a motorcycle helmet can provide a medium for components 120-138 to reside. Components 120-138 can include, but is not limited to, speakers 120 (e.g., stereo speaker configuration), internal rear facing camera 124 (e.g., blind spot monitoring), accelerometer 130, data port 132 (e.g., S-Video out), flash memory 134, microphone 136, processor 138, and the like. It should be appreciated that components 120-138 can be clustered and/or can be distributed throughout the shell 112, layer 114, shell 116, and/or visor 118. Embodiment 110 can lack a heads up display (HUD) which can be replaced with a voice user interface. For example, for a wearer to interact with the smart helmet, a voice command can be spoken. In one instance, audio notifications can be presented to assist the wearer during travel. Assistance can include pre-collision notifications, emergency assistance, vehicle information presentation, navigation assistance, and the like.

In one instance, functionality including, but not limited to, audio/video processing, application management, configuration, and the like can be offloaded to proximate devices. For example, a mobile phone (e.g., IPHOND, ANDRIOD) can be utilized to download and/or manage images captured by camera 124.

In one instance, helmet 111 can function as a black box device. In the instance, layer 114 can include fire retardant materials, fire resistant materials, shock absorbing materials, and the like. That is, layer 114 can protect components 120-138 during an impact, fall, fire, and the like.

Figure 2A:
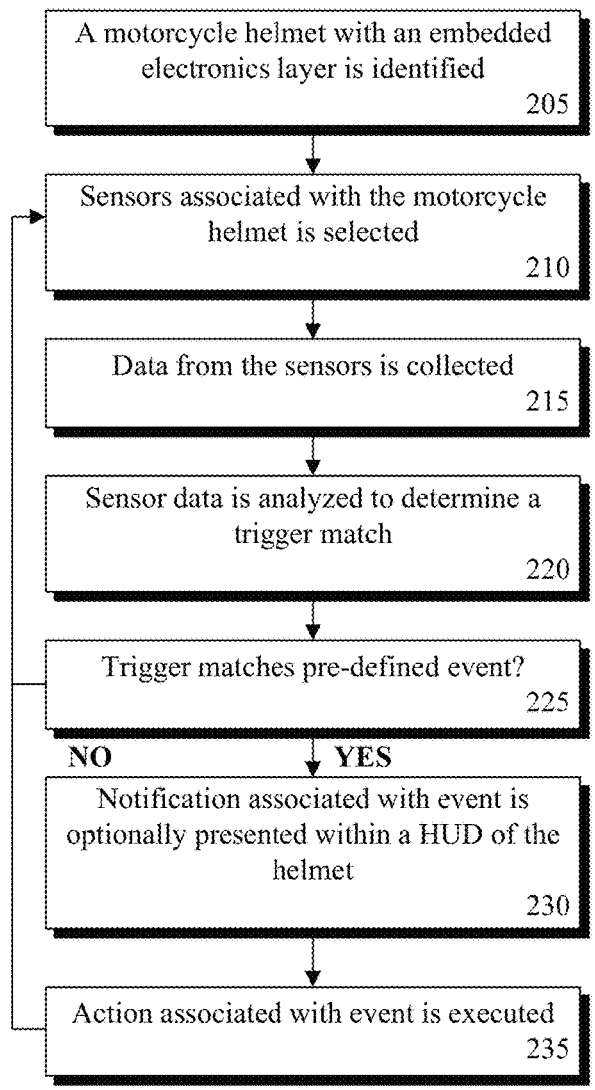
FIG. 2A is a schematic diagram illustrating a method for embedding intelligent electronics within a motorcycle helmet in accordance with an embodiment of the inventive arrangements disclosed herein.

FIG. 2A is a schematic diagram illustrating a method 200 for embedding intelligent electronics within a motorcycle helmet for blind spot detection in accordance with an embodiment of the inventive arrangements disclosed herein. In method 200, a motorcycle helmet can include embedded electronic components able to assist a motorcycle rider. For example, these components can identify objects present in the rider's blind spot and provide warnings of the same. Method 200 can be performed in real-time or near real-time. Steps 205-235 can be performed in serial and/or in parallel.

In step 205, a motorcycle helmet with an embedded electronics layer can be identified. In step 210, sensors associated with the motorcycle helmet can be selected.

Selection can be ordered, random, and the like. In step 215, data from the sensors can be collected. Collection can be performed via polling, pushing, and the like. In step 220, sensor data can be analyzed to determine a trigger match. Triggers can be manually and/or automatically established. One trigger can provide a notification, when a vehicle or other object is detected within a rider's blind spot. In another example, a trigger for exceeding a speed limit of a roadway can be manually established, enabling the rider to conform to traffic laws. If the trigger matches pre-defined event, the method can continue to step 230, else return to 210. In step 230, a notification associated with the event can be optionally presented within a heads up display (HUD) or other output element of the helmet and/or output element of a motorcycle. The notification can be an aural and/or visual notification. In step 235, an action associated with the event can be executed. For example, a log (e.g., date, time, location) can be stored for each time a rider exceeds the speed limit of the roadway.

Drawings presented herein are for illustrative purposes only and should not be construed to limit the invention in any regard. Method 200 can be performed during wear, enabling a smart helmet to aid a motorcycle rider while travelling.

Figure 2B:
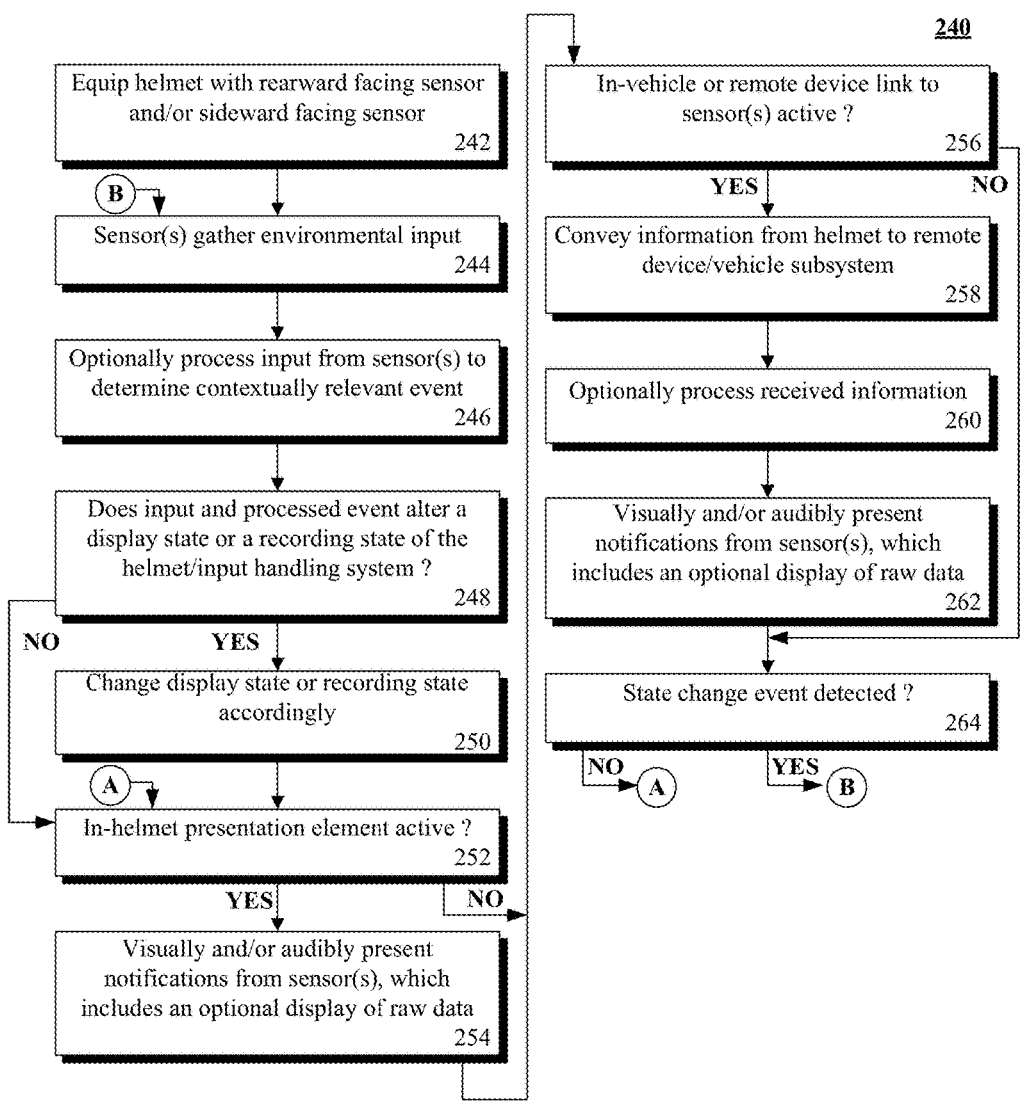
FIG. 2B is a flow chart for capturing and utilizing information from in-helmet rearward and sideward facing sensors in accordance with an embodiment of the inventive arrangements disclosed herein.

FIG. 2B is a flow chart 240 for capturing and utilizing information from in-helmet rearward and sideward facing sensors in accordance with an embodiment of the inventive arrangements disclosed herein. Additional sensor input can be aggregated with the input from the rearward and/or sideward facing sensors in contemplated embodiments. The sensor(s) can include cameras, but are not limited in this manner. For example, audible sensors can detect ambient noise, which can be translated to objects being in a wearer's blind spot. In another embodiment, a sonic emission (outside of audible range) can be emitted from the helmet and echoes can be received, which are used to detect objects within a wearer's blind spot. For nighttime sensing, light sensors can detect a presence of headlight projections in a wearer's blind spot.

Flow chart 240 can being in step 242, where a helmet (e.g., a motorcycle helmet, sports helmet, bicycle helmet, etc.) is equipped with at least rearward and/or sideward facing sensors. These sensors can include video cameras, image capture mechanisms, motion detection sensors, pressure change sensors, wind sensors, and other sensors for detecting environmental objects. In step 244, the sensor(s)

can gather environmental input. In step 246, this input can be optionally processed to determine contextually relevant information and/or an occurrence of a contextually relevant event. For example, input can be processed to determine that there is a vehicle positioned to the side or behind a motorcycle rider.

In one embodiment, the input and/or processed results may alter a display state or recording state of the help or input handling system. For example, a helmet's system can be designed to only show warnings/video on a side if there is a car or other vehicle present. Similarly, warnings can be selectively presented only when conditions associated with the warnings are satisfied. Input can affect whether sensor gathered information is recorded in a memory or not, in one embodiment. In another embodiment, input from the sensors can affect whether sensor gathered information is displayed or not. In step 248, if the input and/or processed even alters a display state or a recording state of the helmet/handling system, the method can progress to step 250 where the state can be adjusted.

Sensor gathered information and/or results of processed sensor information can result in a presentation of the information within the helmet and/or within a vehicle (or other remote device) display. Step 252 determines whether an in-helmet presentation element is active. If so, a notification from the sensor(s) can be visually and/or audibly presented. This presentation can occur through a heads-up display and/or through a speaker, as shown by step 254. The information may include raw data, such as video and may include processed data.

Step 256 determines whether an in-vehicle or other remove device for receiving sensor input has an active link. If so, information can be conveyed from the sensor of the helmet to the remote device (or vehicle subsystem), as shown by step 258. In step 260, the received information is optionally processed. In step 262, a notification, message, or output resulting from sensor(s) gathered data can be visually and/or audibly presented. This presentation can occur through a vehicle control, through a speaker, and the like. The information may include raw data, such as video and may include processed data.

If no state change event occurs in step 264, information can continue to be received, processed, and conveyed per the current settings. When a change state event is detected, a recording and/or displayed state can be changed. This can cause a recoding to automatically start/stop, can cause a display view to appear/disappear, and the like.

Figure 3:
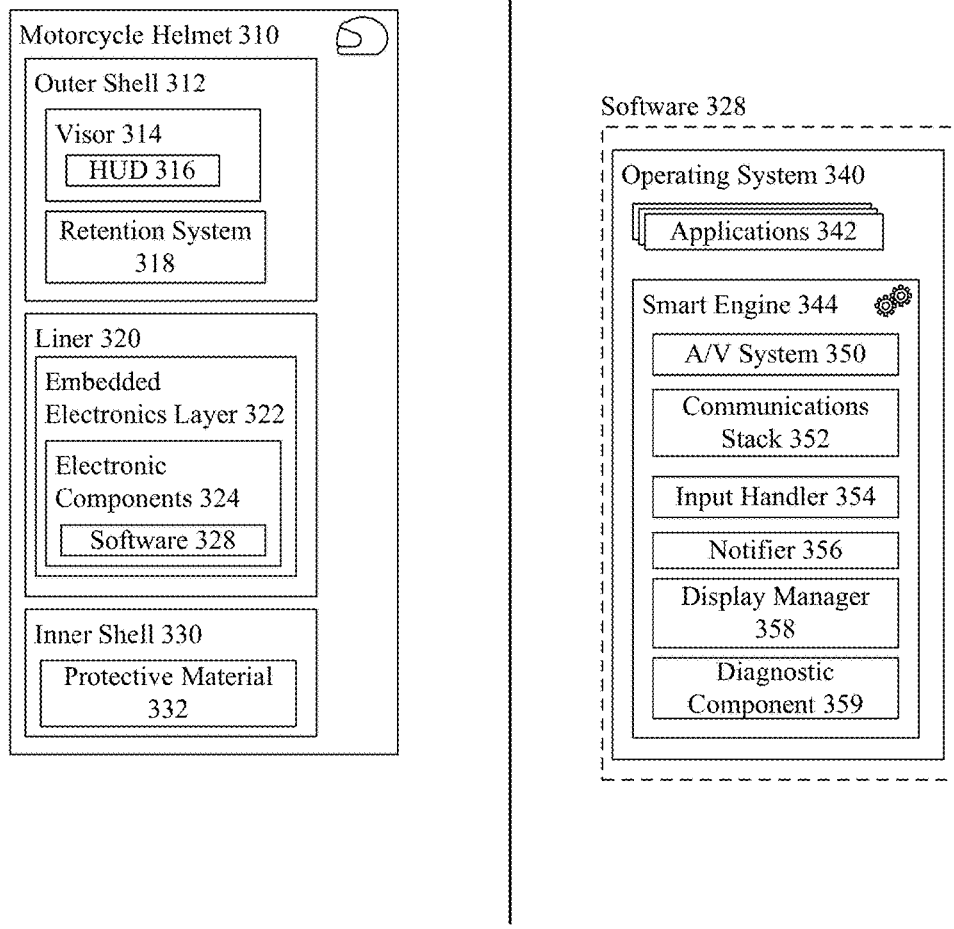
FIG. 3 is a schematic diagram illustrating a system for embedding intelligent electronics within a motorcycle helmet in accordance with an embodiment of the inventive arrangements disclosed herein.

FIG. 3 is a schematic diagram illustrating a system 300 for embedding intelligent electronics within a motorcycle helmet in accordance with an embodiment of the inventive arrangements disclosed herein. System 300 can be present in the context of scenarios of FIG. 1A, 1B, 1C and/or method 200. System 300 can include a motorcycle helmet 310 arrangement and a software 328 arrangement. In system 300, a motorcycle helmet 310 can include an outer shell 312, liner 320, and inner shell 330. Liner 320 can include electronic components 324 enabling the execution of software 328.

Outer shell 312 can be a rigid outer frame able to house liner 320 and inner shell 330. Outer shell 312 can include, but is not limited to visor 314, retention system 318, and the like. Visor 314 can include HUD 316 which can be removed (e.g., detachable), enabled/disabled, and the like. Retention system 318 can include a traditional and/or proprietary retention system. For example, retention system 318 can be an adjustable chin strap. In one instance, shell 312 can be constructed from a microporous material, nanoporous material, and the like. For example, micropores within shell 312 can be utilized to vent heat from components 324 while protecting components 324.

Liner 320 can be a rigid, semi-rigid, and/or compressible liner able to house embedded electronics layer 322. Layer 322 can include, but is not limited to, electronic components 324, a framework (e.g., positioning, stabilizing) associated with components 324, and the like. Components 324 can include executable software 328. In one instance, layer 322 can be removable permitting components 324 diagnosed, repaired, replaced, upgraded, and the like.

Inner shell 330 can be a structure able to house protective material 332. In one instance, shell 330 can be an expanded polystyrene layer, a polyurethane layer, and the like. In one embodiment, piezoelectric speakers and/or microphones can be embedded into the layer to permit sound to be easily transmitted to and received from a wearer. It should be appreciated that shell 330 can include optional elements such as a comfort liner, sizing adjustment padding, and the like.

Software 328 can be a set of programs, procedures, algorithms and related documentation concerned with the operation of a data processing system. Software 328 can include operating system 340. System 340 can execute applications 342, smart engine 344, and the like. Operating system 340 can include traditional and/or proprietary operating systems. For example, system 340 can be a QNX real-time operating system. Applications 342 can include system applications, user applications, and the like.

Smart engine 344 can be a hardware/software element for enabling an intelligent motorcycle helmet. Engine 344 can include, but is not limited to, an A/V system 350, a communication stack 352, an input handler 354, a notifier 356, a display manager 358, a diagnostic component 359, and the like. Engine 344 can include third party software, user established software, and the like.

A/V system 350 can be a hardware/software component for managing audio, video and/or images within system 340. Management can include, but is not limited to, recording audio/video, editing audio/video, deleting audio/video, recording an image, editing an image, deleting an image, and the like. System 350 can be communicatively linked to components 352-359 enabling cohesive functionality.

Communication stack 352 can be a hardware/software stack permitting communication between components 350, 354-359, proximate computing devices, remote computing devices, and the like. Stack 352 can include traditional and/or proprietary communication protocols. Protocols can include, but is not limited to Hypertext Transport Protocol (HTTP), Transport Control Protocol (TCP), Internet Protocol (IP), Session Initiated Protocol (SIP), Real-time Transport Protocol (RTP), Secure Sockets Layer (SSL), and the like.

Input handler 354 can be a hardware/software component able to receive and/or communicate input from a rider and/or component. Handler 354 functionality can include, user input processing, sensor input processing, and the like. Handler 354 can include events, triggers, and the like enabling intelligent behavior responsive to a variety of inputs. For example, a trigger can be established for notifying a rider (e.g., generating a notification) when a gear change is recommended by setting a revolutions per minute value (e.g., 3000) within the trigger. Handler 354 can be communicatively linked to components 352-359 enabling cohesive functionality.

Notifier 356 can be a hardware/software element for presenting and/or managing notifications. Notifier 356 can manage and/or produce audio alerts, visual alerts, tactile alerts (e.g., vibration alert), and the like. Notifier 356 can be an event driven component able to respond to trigger matches. For example, notifier 356 can generate one or more alerts when a rider approaches too close to a vehicle. Notifier 356 can be communicatively linked to components 352-359 enabling cohesive functionality.

Display manager 358 can be a hardware/software component for controlling a heads up display (HUD), an electronic display (e.g., proximate device), and the like. Manager 358 can be utilized to adjust HUD style (e.g., color, size, and theme), HUD brightness, HUD activation/deactivation, HUD interactivity (e.g., sensitivity), sensor display information, and the like. Manager 358 can be communicatively linked to components 352-359 enabling cohesive functionality.

Diagnostic component 359 can be a hardware/software element for performing diagnostic functionality on components within layer 322, software 328, and the like. In one instance, diagnostic component 359 can be an independent element able to identify components, repair components, determine malfunctioning components, and the like. In one embodiment, component 359 can include a redundant system including secondary components of component type 350-358.

Drawings presented herein are for illustrative purposes only and should not be construed to limit the invention in any regard. It should be appreciated that the disclosure is not limited to electronic components 324 embedded within layer 332, but can be distributed throughout the helmet as necessary.

The flowchart and block diagrams in the FIGS. 1A-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A motorcycle helmet comprising:
a plurality of electronic components operating within the motorcycle helmet, wherein at least a portion of the plurality of electronic components is embedded within an outer shell of the helmet or an inner shell of the helmet, wherein the plurality of electronic components comprise one or more internally mounted sensors for detecting objects present in a blind spot of a wearer;
at least one output element of the motorcycle helmet for notifying a wearer of objects present in the blind spot, which are selectively activated only when objects are detected in the blind spot, wherein one of the lights indicates objects in the left hand side blind spot, wherein one of the lights indicates objects in the right hand side blind spot; and
a data store embedded in the motorcycle helmet electronically coupled to the plurality of electronic components, wherein said data store persists blind spot information captured from the one or more internally mounted sensors.

2. The motorcycle helmet of claim 1, wherein the one or more internally mounted sensors comprise one or more rearward facing or sideward facing cameras.

3. The motorcycle helmet of claim 1, wherein the one or more internally mounted sensors comprise two video cameras facing a region corresponding to a wearer's blind spot.

4. The motorcycle helmet of claim 1, further comprising a display integrated to the electronic components that automatically change a display state of the display from an off to an on state responsive to the detecting of objects present in the blind spot of the wearer.

5. The motorcycle helmet of claim 4, wherein the display is a heads up display of the motorcycle helmet, wherein when automatically changed to an on display state responsive to the detecting of the objects, the heads up display dynamically and in real time displays an image or video of the detected objects.

6. The motorcycle helmet of claim 1, wherein the electronic components operating within the motorcycle helmet comprise:
one or more processors; and
one or more memories storing program instructions able to be executed by the one or more processors, said program instructions analyzing video captured by the one or more internally mounted sensors, detecting a presence of objects based on the analyzing, and in response to the detecting, triggering activation of the at least one output elements for notifying a wearer of objects present in the blind spot.

7. The motorcycle helmet of claim 1, further comprising:
a software program executing within the electronic components receiving processed output based on data from the one or more internally mounted sensors; and
an output mechanism integrated into the motorcycle helmet and electronically coupled to the plurality of electronic components for presenting the processed output to a wearer of the helmet.

8. The motorcycle helmet of claim 7, wherein the output mechanism comprises at least one speaker, wherein the processed output is audibly presented to the wearer via the at least one speaker.

9. The motorcycle helmet of claim 1, wherein said electronic components are operable to:
receive an image or a video captured from a rearward or sideward facing sensor of the motorcycle helmet, wherein the sensor is one of the one or more internally mounted sensors;
process the image or video; and
present results of the processing through an output presentation element of the motorcycle helmet.

10. A method comprising:
one or more blind spot sensors integrated into a motorcycle helmet receiving environmental input;
electronics of the motorcycle helmet processing the environmental input to determine a presence of an object or vehicle in a blind spot of a wearer of the motorcycle helmet;
at least one output element integrated into the motorcycle helmet presenting a notification of the object to the wearer in real time responsive to the processing and determining of the presence of the object in the blind spot; and persisting blind spot information, captured from the one or more blind spot sensors, in a data store embedded in the motorcycle helmet, wherein the data store is electronically coupled to the electronics.

11. The method of claim 10, wherein the at least one blind spot sensors comprise at least one camera, wherein the environmental input is video captured by the at least one camera, wherein said processing analyzes the video to determine the presence of the object.

12. The method of claim 10, further comprising:
at least two lights functioning as an output element integrated into the motorcycle helmet visually presenting a notification of the object to the wearer in real time responsive to the processing and determining of the presence of the object in the blind spot, wherein one of the lights indicates objects in the left hand side blind spot, wherein another of the lights indicates objects in the right hand side blind spot.

13. The method of claim 10, wherein the at least one output element is two or more output elements, wherein the two or more output elements include one output element indicating an object being present in a right hand side blind spot of the helmet, wherein the two or more output elements include one output element indicating an object being present in a left hand side blind spot of the helmet.

14. The method of claim 10, wherein the at least one output element comprises at least one light, icon, or text notification, which is activated and presented to indicate a presence of the object in the blind spot.

15. A method comprising:
receiving an image or a video captured from a rearward or sideward facing sensor of a motorcycle helmet, wherein the sensor is embedded in an electronics layer sandwiched between an outer shell of the helmet and an inner shell of a motorcycle helmet;

processing the image or video utilizing electronic circuitry in the electronics layer of the motorcycle helmet, wherein the processing determines a change in a display state based on the received input;

dynamically and in real time displaying the image or video on the heads up display of the helmet; and persisting the image or video, captured from the rearward or sideward facing sensor of the motorcycle helmet, in a data store embedded in the motorcycle helmet, wherein the data store is electronically coupled to electronics of the electronics layer.

16. The method of claim 15, further comprising:
determining an approach of a vehicle from the rear or side as a result of the processing;

the electronic circuitry generating an audible notification that informs a wearer of the helmet of the approach of the vehicle; and audibly presenting the audible notification using a speaker in the helmet.

17. The method of claim 15, wherein the video is captured using the sensor, said method further comprising:
visually presenting the video in real-time in a heads up display of the helmet.

18. The method of claim 15, further comprising:
recording the image or video on a storage medium embedded within the helmet.

19. The method of claim 15, wherein the processing of the image or video detects a vehicle in a blind spot of the motorcycle helmet wearer, said method further comprising:
responsive to detecting the vehicle in the blind spot, audibly presenting a notification of the vehicle in the blind spot via a speaker of the motorcycle helmet.

* * * * *